Sept. 21, 1937. H. HILLIER ET AL 2,093,963
PRESSURE FLUID DISTRIBUTING VALVE UNIT FOR RECIPROCATING ENGINES
Filed July 15, 1936 3 Sheets-Sheet 2

Sept. 21, 1937. H. HILLIER ET AL 2,093,963
PRESSURE FLUID DISTRIBUTING VALVE UNIT FOR RECIPROCATING ENGINES
Filed July 15, 1936 3 Sheets-Sheet 3

Patented Sept. 21, 1937

2,093,963

UNITED STATES PATENT OFFICE 2,093,963

PRESSURE FLUID DISTRIBUTING VALVE UNIT FOR RECIPROCATING ENGINES

Harold Hillier, Cathcart, Glasgow, and David Cuthbertson Hagen, Shawlands, Glasgow, Scotland, assignors to G. & J. Weir, Limited, Cathcart, Glasgow, Scotland, a corporation of Great Britain and Northern Ireland Application July 15, 1936, Serial No. 90,792
In Great Britain October 11, 1935

2 Claims. (Cl. 121—157)

This invention relates to improvements in pressure fluid distributing valves for direct-acting reciprocating engines such as steam-driven pumps and the like, and is concerned particularly with distributing valve units of the type including a main valve which is reciprocated by pressure fluid under the control of an auxiliary valve which is reciprocated by connections with the reciprocator of the engine.

As is understood, it is desirable that reversal of the reciprocator of a direct-acting pump or the like should be effected without shock.

The present invention has for an object to provide an improved distributing valve unit devised to ensure easy reversal of the reciprocator under varying operating conditions.

In a pressure fluid distributing valve unit according to the invention the main valve controls pilot admission to the engine of pressure fluid to an extent sufficient to drive the reciprocator at a low speed only, while the auxiliary valve controls main admission of pressure fluid so as first to increase admission and subsequently to reduce admission in each stroke of the reciprocator at a rate which is a function of the speed of the reciprocator.

Figure 1:
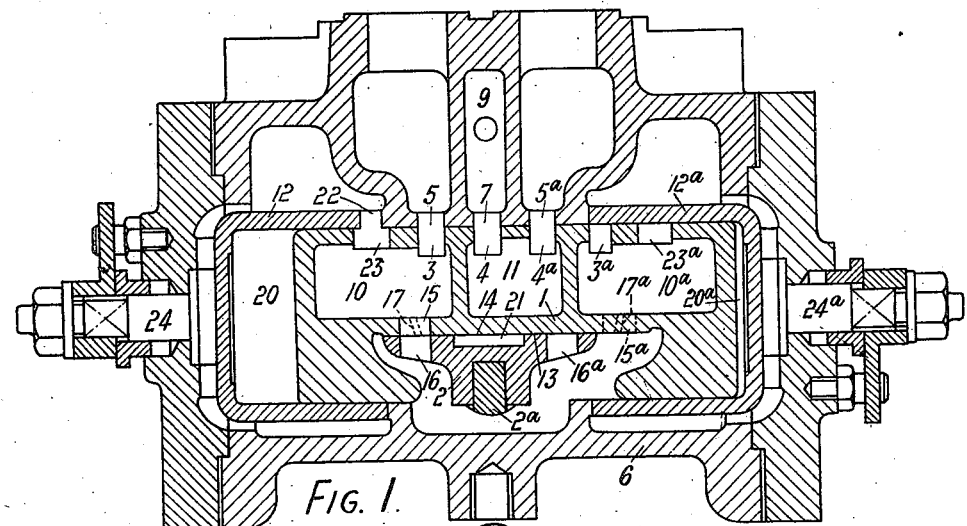
Figure 2:
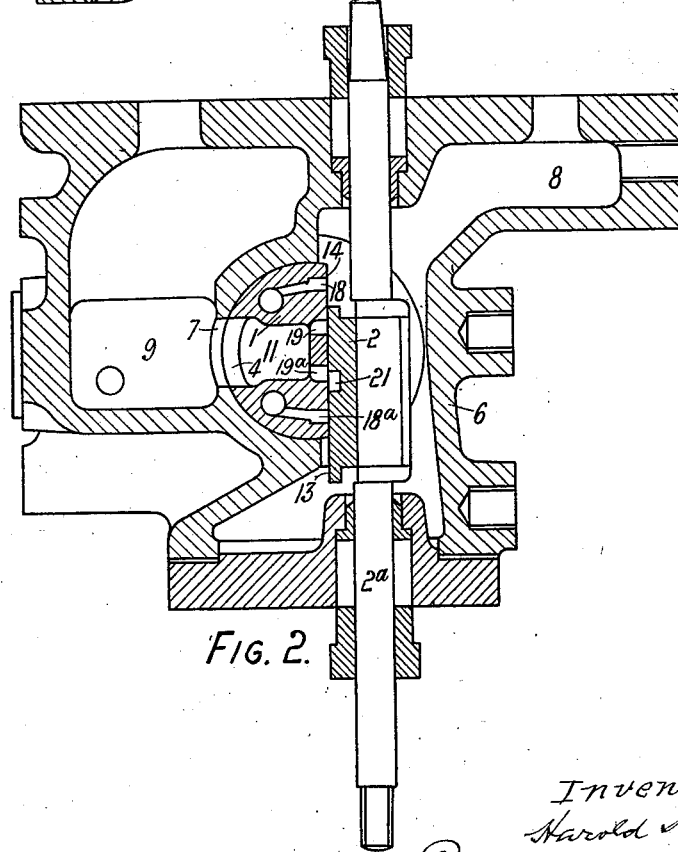
Figure 3:
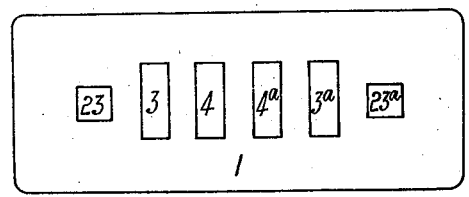
Figure 4:
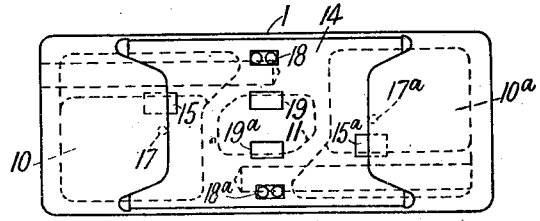
Figure 5:
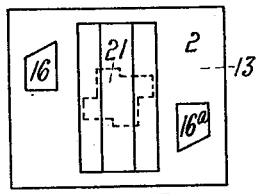
Figure 9:
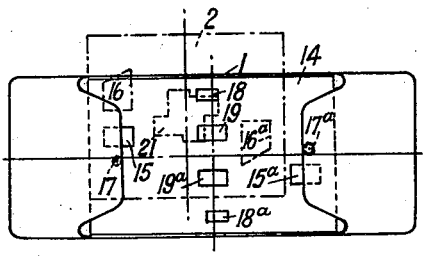
Figure 10:
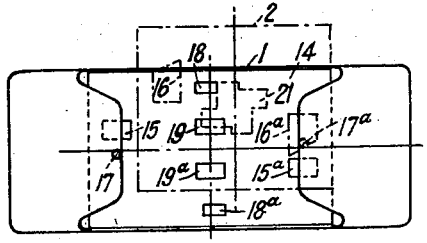
Figure 8:
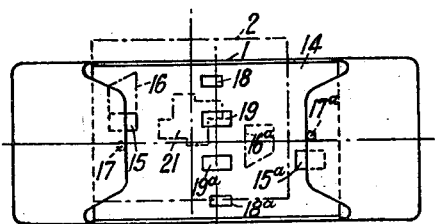
Figure 11:
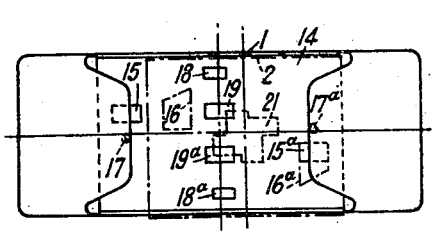
Figure 7:
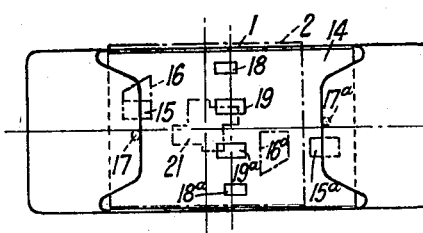
Figure 12:
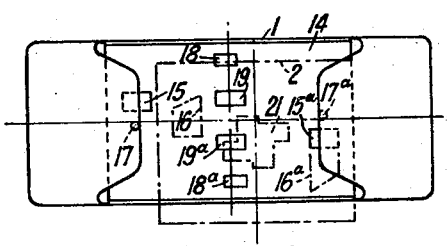
Figure 6:
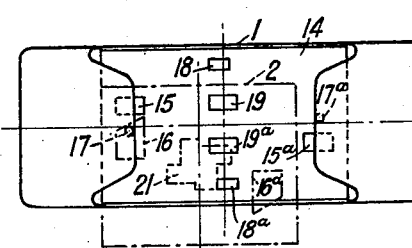
Figure 13:
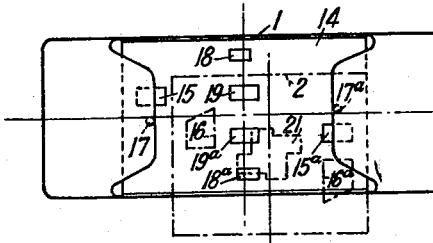

A pressure fluid distributing valve unit constructed in accordance with the present invention is illustrated in the accompanying drawings in which Fig. 1 is an axial section, Fig. 2 a transverse section, Fig. 3 a porting diagram of the main valve, Fig. 4 a rear elevation of the main valve, and Fig. 5 a rear elevation of the auxiliary valve. Figs. 6 to 13 indicate diagrammatically the location of the main and auxiliary valves in the cycle of operations. Fig. 6 shows the position of the auxiliary valve relatively to the main valve at the commencement of the upstroke of the piston; Fig. 7 shows the relative position of the valves at the commencement of the cut-off during the upstroke; Fig. 8 shows the relative position of the valves at cut-off during the upstroke; Fig. 9 shows the relative position of the valves at the finish of the upstroke; Fig. 10 shows the relative position of the valves at the commencement of the down stroke of the piston; Fig. 11 shows the relative position of the valves at the commencement of cut-off during the down stroke; Fig. 12 shows the relative position of the valves at cut-off position during the down stroke; and Fig. 13 shows the relative position of the valves at the finish of the down stroke.

The pressure fluid distributing valve unit shown comprises a main valve 1 which is reciprocated by pressure fluid under the control of an auxiliary valve 2 which is in direct contact with the main valve and which is reciprocated by connections including a valve spindle 2ª actuated by the piston of the engine, the auxiliary valve 2 being reciprocated transversely of the line of reciprocation of the main valve 1.

The main valve 1 is provided with steam ports 3, 3ª and with exhaust ports 4, 4ª. The ports 3, 3ª are co-operative, respectively, with ports 5, 5ª formed in the valve chest 6 and communicating with opposite ends of the engine cylinder. The ports 4, 4ª are co-operative with the ports 5, 5ª and with a central exhaust port 7 in the valve chest 6. Steam is admitted to the chest 6 by way of a passage 8, and exhaust is led away from the port 7 by way of a passage 9. The main valve 1 is cylindrical and hollow, and is partitioned internally into three compartments namely, steam end-compartments 10, 10ª, and a central exhaust compartment 11. The end portions of the main valve 1 reciprocate within angularly adjustable bell-shaped barrels 12, 12ª. The auxiliary valve 2 presents a plane valve face 13 which co-operates with a plane valve face 14 presented by the main valve 1. Formed in the valve face 14 are two main steam inlet ports 15, 15ª opening one into each of the compartments 10, 10ª and co-operative, respectively, with two main steam inlet ports 16, 16ª in the auxiliary valve 2. Adjacent to the ports 15, 15ª in the main valve face 14 are pilot inlet ports 17, 17ª opening also into the compartments 10, 10ª, respectively. Formed also in the valve face 14 are two ports 18, 18ª and two ports 19, 19ª, also controlled by the auxiliary valve 2. The ports 18, 18ª communicate, respectively, with chambers 20, 20ª at the opposite ends of the main valve 1, and the ports 19, 19ª both open into the exhaust compartment 11. For the control of the ports 18, 18ª and 19, 19ª, there is formed in the face 13 of the auxiliary valve 2 an exhaust recess 21. Each of the barrels 12, 12ª is provided with a steam supply port 22 adapted, by adjusting the respective barrel angularly, to be brought into register with a by-pass port 23 or 23ª in the main valve 1, for the purpose of by-passing steam to either side of the piston.

In operation, when the piston of the engine is at one end of its stroke (say the bottom end for convenience of description), the main valve 1 is at the right-hand end of its travel, and the auxiliary valve 2 is at the lower end of its travel, with reference to and as shown in Figs. 1, 2 and 6. The upstroke of the engine piston is commenced slowly by pilot steam which passes to the under side of the piston by way of the ports 16, 17, 3, and 5, the top side of the piston being open to exhaust by way of the ports 5ª, 4ª, 4, and 7. As the piston ascends, the auxiliary valve 2 also ascends; in Fig. 7 position the port 16 has unmasked the port 15 to steam which passes to the underside of the engine piston by way of the ports 16, 15, 3, and 5, so that the ascent of the piston is accelerated, the pilot port 17 being masked. In Fig. 8 position, before the end of the upstroke of the piston, the ports 15 and 17 are both completely masked and the auxiliary valve 2 cuts off the supply of steam to the underside of the piston, which completes its upstroke under the expansion of the steam on its under side, allowing a very gradual retardation. In Fig. 8 position, the auxiliary valve 2 has uncovered the port 18ª to steam but no movement of the main valve takes place until the auxiliary valve 2 reaches Fig. 9 position when the port 18 is opened to exhaust, so that steam is admitted to the chamber 20ª and the main valve 1 is displaced to the left-hand end of its travel, the chamber 20 being open to exhaust by way of the ports 18, 19 and the recess 21. The relative positions of the main valve and the auxiliary valve are then as shown in Fig. 10. In this location of the main valve 1, the port 3ª registers with the port 5ª, the port 4ª with the port 7, and the port 4 with the port 5, and steam is supplied to the top side of the piston, to start the downstroke thereof, by way of the ports 16ª, 17ª, 3ª, and 5ª. As the piston descends, the auxiliary valve 2 also descends, and the port 16ª unmasks the port 15ª to steam which passes to the top side of the piston by way of the ports 16ª, 15ª, 3ª, and 5ª, so that the descent of the piston is accelerated, the pilot port 17ª being masked in the downward travel of the auxiliary valve 2. Before the end of the downstroke of the piston the auxiliary valve 2 cuts off the supply of steam to the top side of the piston which completes its downstroke under the expansion of the steam on its top side. As the piston approaches the end of its downstroke, the auxiliary valve 2 first opens the port 18 to steam and then opens the port 18ª to exhaust, so that the main valve 1 is displaced to the right-hand end of its travel, in order to commence a new operative cycle. The cycle of operations in the downstroke of the engine piston is illustrated in Figs. 11, 12, and 13.

The auxiliary valve 2 operates without a lazy bit or lost motion in the valve gearing other than that necessary for adjustment of length of stroke. The leading edges of the ports 16, 16ª are inclined as shown in Fig. 5 so as to enhance gradual main admission action.

The main valve control ports 18, 18ª and 19, 19ª and the co-operative recess 21 in the auxiliary valve 2 are so arranged that the end movements of the main valve 1 are steam-cushioned.

When starting the engine from cold condition, the expansion after cut off may not be sufficient to carry the piston the full stroke length. To provide for this contingency, steam may be admitted to either side of the piston by adjusting the barrel 12 or 12ª angularly to bring the steam supply port 22 in the barrel into register with the by-pass port 23 or 23ª in the main valve 1, whereby to displace the piston to the end of its travel corresponding to the location of the main valve 1.

The barrels 12, 12ª are unitary with spindles 24, 24ª, respectively, projecting exteriorly of the valve chest 6 for engagement by means for effecting angular adjustment of the barrels 12, 12ª.

It will be seen that the auxiliary valve 2 effects graduated admission of steam to the engine at a rate which is a function of the speed of the reciprocator, thus ensuring consistently easy reversal of the piston under varying operating conditions, and preventing dangerous acceleration of the piston in the event of removal of the load or part of the load.

We claim:—

1. A pressure fluid distributing valve unit for reciprocating steam engines, comprising, in combination, a hollow reciprocatory main valve formed with two valve faces, with main inlet ports and pilot inlet ports intersecting one of said valve faces, and with admission ports and exhaust ports intersecting the other valve face, a valve chest formed with ports into register with which said admission and exhaust ports are brought by movement of the main valve, and a reciprocatory auxiliary valve deriving from the reciprocator of the engine reciprocatory movements transverse to the path of movement of the main valve, said auxiliary valve bearing directly on the main valve and controlling the supply of pressure fluid to the ends of the main valve for effecting reciprocation of the main valve, said auxiliary valve being provided with main inlet ports cooperative with the inlet ports in the main valve to control the passage of fluid to and through the main inlet ports in the main valve whereby in each limiting position of the main valve first to increase the admission gradually and subsequently to reduce the admission gradually to the reciprocator, the relative movement of the co-operating ports being a direct function of the speed of the reciprocator.

2. A pressure fluid distributing valve unit for reciprocating steam engines, comprising, in combination, a hollow cylindrical main valve formed with two valve faces, with main inlet ports and pilot inlet ports intersecting one of said valve faces, with admission ports and exhaust ports intersecting the other valve face, and with bypass ports, a valve chest formed with ports into register with which said admission and exhaust ports are brought by movement of the main valve, and a reciprocatory auxiliary valve deriving its reciprocatory movements from the reciprocator of the engine and controlling the supply of pressure fluid to the ends of the main valve for effecting reciprocation of the main valve, said auxiliary valve being provided with main inlet ports cooperative with the inlet ports in the main valve to control the passage of fluid to and through the main inlet ports in the main valve whereby in each limiting position of the main valve first to increase the admission gradually and subsequently to reduce the admission gradually to the reciprocator, the relative movement of the co-operating ports being a direct function of the speed of the reciprocator, and barrels within said valve chest accommodating the ends of the main valve, each of said barrels being provided with a supply port and being angularly adjustable to bring its supply port into register with the corresponding by-pass port in the main valve.

HAROLD HILLIER.
DAVID CUTHBERTSON HAGEN.